Figure 1:
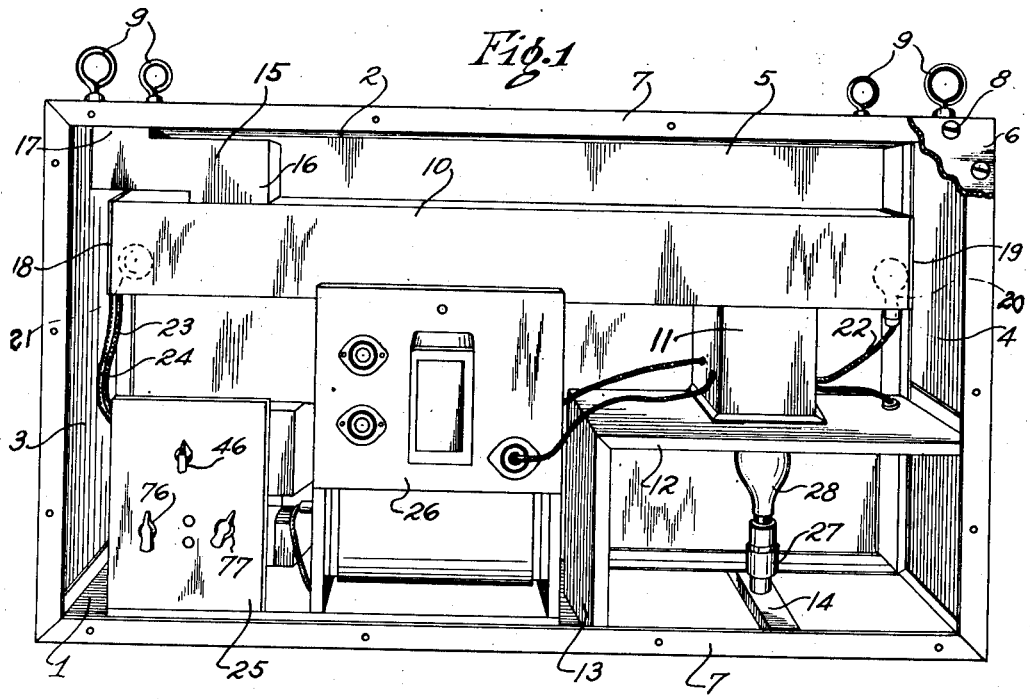

May 17, 1949.　　　R. D. McDILL　　　2,470,511

DETECTION OF IMPURITIES

Filed July 12, 1944

INVENTOR.
Rex D. McDill
BY
Haugood and Van Horn,
ATTORNEYS

Patented May 17, 1949

2,470,511

UNITED STATES PATENT OFFICE 2,470,511

DETECTION OF IMPURITIES

Rex D. McDill, Cleveland Heights, Ohio, assignor to James B. Shaver, University Heights, Ohio Application July 12, 1944, Serial No. 544,562

3 Claims. (Cl. 98—1)

This invention relates to the detection of impurities in the atmosphere or other gases and their elimination therefrom.

In conjunction with air conditioning of buildings and other spaces, a frequent problem which arises is the elimination of toxic and other dangerous types of impurities from the atmosphere.

Early attempts to eliminate such materials concerned themselves mainly with supplying fresh air, as by opening windows, ventilators or the like, or by exhausting polluted air, under manual control and at the judgment of an operator.

This, in turn, led to attempts empirically to determine the rate of replacement of atmosphere which would remove the impurities at an average rate in proportion to their production.

Such systems have been found unsatisfactory for a number of reasons. The manual control, of course, was dependent entirely upon the judgment of the operator.

Any more or less continuous process does not adapt itself to sudden or extreme variations, and can obtain satisfactory ventilation only when set to replace the maximum amount of air necessary under the most extreme conditions.

This leads to inefficiency, particularly loss of heat and power, as will readily be appreciated from the consideration of such a building as a foundry, where at times there may be excessive amounts of dust, smoke and other deleterious substances in the air, and if a ventilator, for instance one equipped with a fan, be adjusted to remove these impurities under the worst conditions, great quantities of heated air are extracted at times when there is no necessity for such extraction, and, particularly in winter weather, much useful heat is thus lost.

If an accurate control be provided which will operate ventilating mechanism and the like in accordance with the quantities of impurities carried by the air, it will be apparent that great savings can be effected.

However, the impurities which normally are present are of a very finely divided character, frequently minute particles of dust, carbon and the like, so that an accurate determination of the quantity of them by purely mechanical means is impracticable, while variations in lighting, both due to daylight and artificial sources, have rendered the electronic determination heretofore unsatisfactory.

It is an object of the present invention to overcome the difficulties heretofore experienced in controlling ventilating and air conditioning apparatus in accordance with the quantities of impurities present within a structure.

Another object is to provide means for determining accurately the quantities of such impurities, which determination will not be influenced by extraneous factors such as variations in light, barometric pressure, temperature, and the like.

It is a further object of the invention to provide an improved means for measuring impurities in the air which may be used to actuate ventilating or similar apparatus, so that air which has been contaminated to any predetermined extent may be replaced.

Another object is to provide an improved method of measuring the quantity of impurities in a gaseous medium.

Other objects will hereinafter appear.

Figure 2:
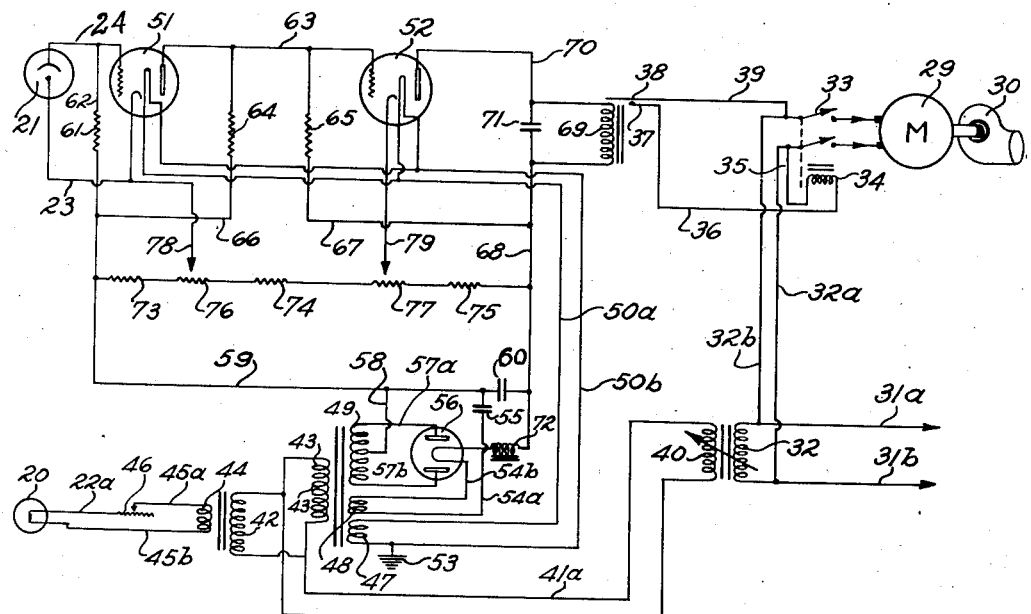

The invention will be better understood from the description of one practical apparatus which constitutes one embodiment thereof, illustrated in the accompanying drawings, in which:

Figure 1 is a perspective of the assembled apparatus, the front or cover being broken away; and, Figure 2 is a diagrammatic illustration of the circuits and parts associated therewith.

The apparatus illustrated is shown as assembled in a compact unit enclosed in a generally rectangular casing having a bottom 1, top 2, ends 3 and 4, a back 5 and a front or cover plate 6, secured to the peripheral flanges 7 of the top, bottom and ends as by screws 8.

Rings 9 are fixed to the top 2 by which the entire device may be suspended in any desired location, it being unnecessary that it be rigidly connected with any other apparatus.

Extending horizontally within the casing is a rectangular conduit 10 defining a light-tight passage for air and gases, this conduit being in communication with a downwardly extending inlet 11 which, in turn, communicates with a larger intake space defined by a horizontal shelf 12 and vertical end 13, which, with end 4, back 5 and front 6 forms a compartment open at its bottom except for transversely extending bar 14 which is fixed to the bottom flanges 17, it being understood that the bottom 1 extends merely from the end 3 to vertical wall 13.

Above the top of conduit 10, adjacent its end remote from intake passage 11, extends a short rectangular conduit 15 having closed ends, and, adjacent its right hand end (as seen in Figure 1) having a depending portion 16 communicating with the interior of conduit 10 and at its other end an upwardly extending portion 17 which is connected at an opening in the top 2, to serve as an outlet for air and gases which have passed through conduit 10.

The passages within the inlet and outlet conduits consist of mutually offset parts, causing the air to follow a sinuous path and preventing any rays of light from the outside from entering conduit 10.

The ends of conduit 10 are closed by plugs 18 and 19 which extend through the ends 3 and 4 of the casing and are removable from the exterior thereof, one of which (19) carries a source of light 20, which is illustrated as an electric light bulb, and the other of which (18) carries a photo-electric cell 21, these being connected by cables or electrical conduits 22, 23 and 24 to the electrical apparatus which is positioned upon and adjacent to two panels 25 and 26.

Supported upon the bar 14 is a socket 27 which carries an ordinary electric incandescent lamp 28, positioned immediately below the opening at the lower end of the depending conduit 11.

The circuits and the manner of operation of the device will be more apparent from the description of Figure 2 of the drawing.

In this figure, an electric motor is shown at 29, this being connected to a blower or other air-handling device 30 which it is desired to operate in some relation to the amount of smoke, dust particles or the like contained in the air.

Current is supplied from any suitable source, such as a central power station, through electrical conductors 31a and 31b to the primary 32 of a transformer, which, in turn, furnishes the current required by the parts of the apparatus contained in the casing.

From conductors 31a and b branch conductors 32a and b respectively, lead to a relay 33 through which current may be supplied to operate the motor 29.

The electro-magnetic coil for operating the relay is shown at 34 and is supplied with current from conductors 32a and b through conductors 35 connected from wire 32a directly to one end of the coil and through a conductor 36 which extends to one contact 37 of a relay, the other contact 38 of which is connected by a conductor 39 to the conductor 32b, the contacts 37 and 38 being controlled by the apparatus which is actuated by current induced in secondary 40 of the constant voltage transformer which includes primary 32. This secondary is connected by conductors 41a and 41b to the primaries 42 and 43 of two more transformers.

The secondary 44 of the first of these, associated with primary 42, is connected by conductors 45a and 45b and conductor 22a, through a rheostat 46, to supply current to electric light bulb 20. It will be understood that parts of both conductors 22a and 45b are included in conduit 22 of the first figure.

In the transformer including primary 43 are three secondary coils 47, 48 and 49.

From secondary 47 conductors 50a and 50b extend to the filaments of two thermo-ionic valves or tubes 51 and 52, conductor 50b being grounded as indicated at 53.

From secondary 48 conductors 54a and b extend, the former being connected to a condenser 55 and the latter to one end of the filament of a rectifier tube 56.

The two plates of rectifier tube 56 are connected by conductors 57a and b to the ends of secondary 49.

From secondary 49 a central tap 58 connects to a conductor 59, one end of which is branched, one branch being connected to condenser 55 and the other branch to condenser 60. Conductor 59 extends upwardly as seen in Figure 2, to a resistance 61, which is connected by conductors 62 and 24 to one element of the photocell 21 and also to the grid of thermionic valve 51.

From the plate of thermionic valve 51 to the grid of the thermionic valve 52 extends a conductor 63 to which are connected two resistances 64 and 65.

The other end of resistance 64 is connected by conductor 66 to conductor 59, while the other end of resistance 65 is conducted by a conductor 67 to a conductor 68 which extends from condenser 60 to the coil 69 of the relay including contacts 37 and 38.

From the other end of this relay coil 69, a conductor 70 extends to the plact of thermionic valve 52.

In parallel with the coil 69, between conductors 68 and 70, is a condenser 71.

The lower end of conductor 68 is branched, one branch, as above indicated, being connected to condenser 60, and the other being connected to the coil of a filter choke coil 72. The other end of this coil is connected to the filament of rectifier tube 56.

Extending between conductors 59 and 68 is a conductor including three fixed resistances 73, 74 and 75 and two variable resistances, such as potentiometers 76 and 77.

From the movable contact of potentiometer 76 and conductor 78 extends to the other element the photo-electric cell 21, having a branch connected to the cathode of thermionic valve 51.

From the variable contact or potentiometer 77 and conductor 79 extends the cathode of thermionic valve 52.

In one example which has been actually installed and found to operate satisfactorily on 110 volts, 60 cycle, line current at lines 31a and 31b, the following have been found satisfactory constants.

| | |
|---|---|
| Rheostat 46 | 15 ohms |
| Light bulb 20 | 6 volts, 21 candle power |
| Rectifier tube | 5U4G |
| Thermionic valves 51 and 52 | 6-J5 |
| Resistance 61 | 60 megohms |
| Resistance 64 | 3 megohms |
| Resistance 65 | 3500 megohms |
| Resistance 73 | 1000 megohms |
| Resistance 74 | 7000 megohms |
| Resistance 75 | 1000 megohms |
| Potentiometer 76 | 1000 megohms |
| Potentiometer 77 | 2000 megohms |
| Condenser 71 | 2 microfarads |
| Condensers 55 and 60 | 4 microfarads |
| Relay coil 69 | 6000 ohms |

The circuit of bulb 28 is not shown, as this is connected in conventional manner to the line current.

The function of this bulb is to induce a current of air or draft through conduits 11, 10 and 15 to insure conduit 10 being filled at all times with a representative's sample of the atmosphere in which the apparatus is positioned, and it is found that a relatively small light bulb of conventional type induces sufficient connection for this purpose.

Light from this bulb is prevented from entering casing 10 by the offset arrangement of its intake 11, while light from the interior of the building in which the device may be positioned is further prevented from entering conduit 10 by the offset arrangement of the outlet 15, so that the light beam emitted by the bulb 20 supplies the only illumination within the casing 10, and, as this light may be regulated by adjustment of rheostat 46, the quantity which reaches the photo-cell 21 may be made accurately proportionate to the amount of smoke and/or dust particles and other suspended solids in the atmosphere within the casing 10.

Also, by this arrangement the length of the column of mixed air, smoke, dust and the like may be determined to permit the measurement of these suspended solids with any desired degree of accuracy, as it will be apparent that the amount of light obstructed by the solids is proportional to the length of the column through which the light beam must travel, and hence, to the length of casing 10.

Also, due to the projecting ends of the casing 10, both the bulb 20 and cell 21 are positioned out of the direct course of the air currents moving through casing 10 between inlet 11 and outlet 16, and are thus protected from becoming obscured by deposits of dust or smoke particles.

While the tortuous passage of air through inlet 11, casing 10 and outlet 16 is sufficient to exclude external light, the bends are large and open, and, in view of the relatively slow flow of the air through them, do not materially obstruct its passage so that small amount of heat supplied by lamp 28 is found quite adequate in most situations, although, of course, any means for causing the air flow might well be employed, such as a small fan, blower or the like in situations where a higher speed of passage may be desired.

The apparatus permits the continuous sampling of the atmosphere together with prompt, automatic control of any apparatus to eliminate any undesirable conditions as these arise.

While I have described the illustrated embodiment of my invention in some particularity, obviously many others will readily occur to those skilled in this art, and I do not, therefore, limit myself to the precise details shown and described herein, but claim as my invention all embodiments, variations and modifications coming within the scope of the appended claims.

I claim:

1. Measuring apparatus comprising a casing, a horizontal extending conduit therein for sampling air to be conditioned in an enclosure, removable light-tight closures at the ends of said conduit, a source of light within said conduit adjacent one of said closures, a light sensitive element within said conduit and an air sample therein and adjacent the other said closures, a depending inlet conduit communicating with said first mentioned conduit, an upwardly extending exhaust conduit communicating with said first mentioned conduit adjacent its other end and having a plurality of offsets, the inlet and outlet conduits communicating with the first mentioned conduit between the source of light and the light sensitive element, a heating device positioned below the lower end of the inlet conduit, electrical amplifying apparatus within the casing and responsive to said light sensitive element and arranged to operate a relay, a source of current controlled by the relay, and electrically operated air conditioning apparatus for said enclosure operated by said current and controlled by the relay.

2. Measuring apparatus comprising a casing, a horizontal extending conduit therein for sampling air to be conditioned in an enclosure, removable light-tight closures at the ends of said conduit, said closures being accessible from the exterior of the housing, a source of light within said conduit adjacent one of said closures, a light sensitive element within said conduit and an air sample therein and adjacent the other said closures, a depending inlet conduit communicating with said first mentioned conduit, an upwardly extending exhaust conduit communicating with said first mentioned conduit adjacent its other end and having a plurality of offsets, the inlet and outlet conduits communicating with the first mentioned conduit between the source of light and the light sensitive element, a heating device positioned below the lower end of the inlet conduit, electrical amplifying apparatus within the casing and responsive to said light sensitive element and arranged to operate a relay, a source of current controlled by the relay, and electrically operated air conditioning apparatus for said enclosure operated by said current and controlled by the relay.

3. Measuring apparatus comprising a horizontally extending conduit for sampling air to be conditioned in an enclosure, vertically extending inlet and outlet conduits connected therewith on separate sides thereof, said outlet conduit having a plurality of changes in direction and said inlet conduit extending downwardly from said horizontal conduit and below said outlet conduit, a source of light positioned within the first mentioned conduit between one end thereof and one of said vertically extending conduits, a light sensitive element positioned within the first mentioned conduit between the other end thereof and the other vertically extending conduit, and light excluding closures at the ends of the first mentioned conduit, and draft inducing means arranged adjacent one of said vertically extending conduits comprising a heating element, and air conditioning apparatus for said enclosure controlled by said light sensitive element.

REX D. McDILL.

REFERENCES CITED

The following references are of record in the file of this patent:

UNITED STATES PATENTS

| Number | Name | Date |
|---|---|---|
| 878,456 | Darwin | Feb. 4, 1908 |
| 892,241 | Freise | June 30, 1908 |
| 1,626,663 | Brace | May 3, 1927 |
| 1,743,175 | Wensley et al. | Jan. 14, 1930 |
| 1,878,010 | Spahr | Sept. 20, 1932 |
| 1,937,722 | Simon et al. | Dec. 5, 1933 |
| 2,046,714 | Wilson et al. | July 7, 1936 |
| 2,056,663 | Foulke | Oct. 6, 1936 |
| 2,185,361 | Towne | Jan. 2, 1940 |
| 2,311,374 | Farmer et al. | Feb. 16, 1943 |
| 2,339,987 | Evans | Jan. 25, 1944 |